United States Patent [19]

Butler

[11] 3,999,274

[45] Dec. 28, 1976

[54] SHOCK ABSORBER AND METHOD AND APPARATUS FOR ASSEMBLING THE SAME

[75] Inventor: Robert D. Butler, Monroe, Mich.

[73] Assignee: Monroe Auto Equipment Company, Monroe, Mich.

[22] Filed: Apr. 9, 1975

[21] Appl. No.: 566,217

Related U.S. Application Data

[62] Division of Ser. No. 444,759, Feb. 22, 1974, abandoned.

[52] U.S. Cl. .................... 29/243.54; 29/156.5 R; 29/509; 269/228
[51] Int. Cl.² ................ B23P 19/00; B23P 11/00
[58] Field of Search ........ 29/243.53, 243.54, 200 J, 29/156.5 R, 200 B, 509; 269/228, 246, 251; 72/122; 188/322

[56] References Cited

UNITED STATES PATENTS

| | | | |
|---|---|---|---|
| 2,692,520 | 10/1954 | Hayes | 269/228 |
| 3,653,243 | 4/1972 | Ramseier | 72/122 |
| 3,747,382 | 7/1973 | McMaster et al. | 29/243.53 |
| 3,768,137 | 10/1973 | Russell | 29/243.53 |
| 3,768,289 | 10/1973 | Mink | 72/126 |
| 3,800,579 | 4/1974 | Breiter | 29/243.53 |

FOREIGN PATENTS OR APPLICATIONS

412,678  4/1925  Germany ................... 269/251

Primary Examiner—C.W. Lanham
Assistant Examiner—Dan C. Crane
Attorney, Agent, or Firm—Harness, Dickey & Pierce

[57] ABSTRACT

A vehicular or similar type shock absorber of the type including a cylindrically shaped housing member defining a fluid chamber, a piston assembly, reciprocally disposed within the chamber and a piston rod arranged generally coaxially of the chamber, and means operatively connecting one end of the piston rod to the piston assembly and including one end of the piston rod projecting through an opening in the piston body and having a terminal end portion formed with an enlarged diameter head which is produced by engaging a tool moving along a generally cycloidal overlapping rosette pattern with the end portion of the piston rod for causing the material of the piston rod to flow generally outwardly into the shape of the enlarged diameter head without the molecular structure thereof being appreciably distorted or otherwise altered.

13 Claims, 8 Drawing Figures

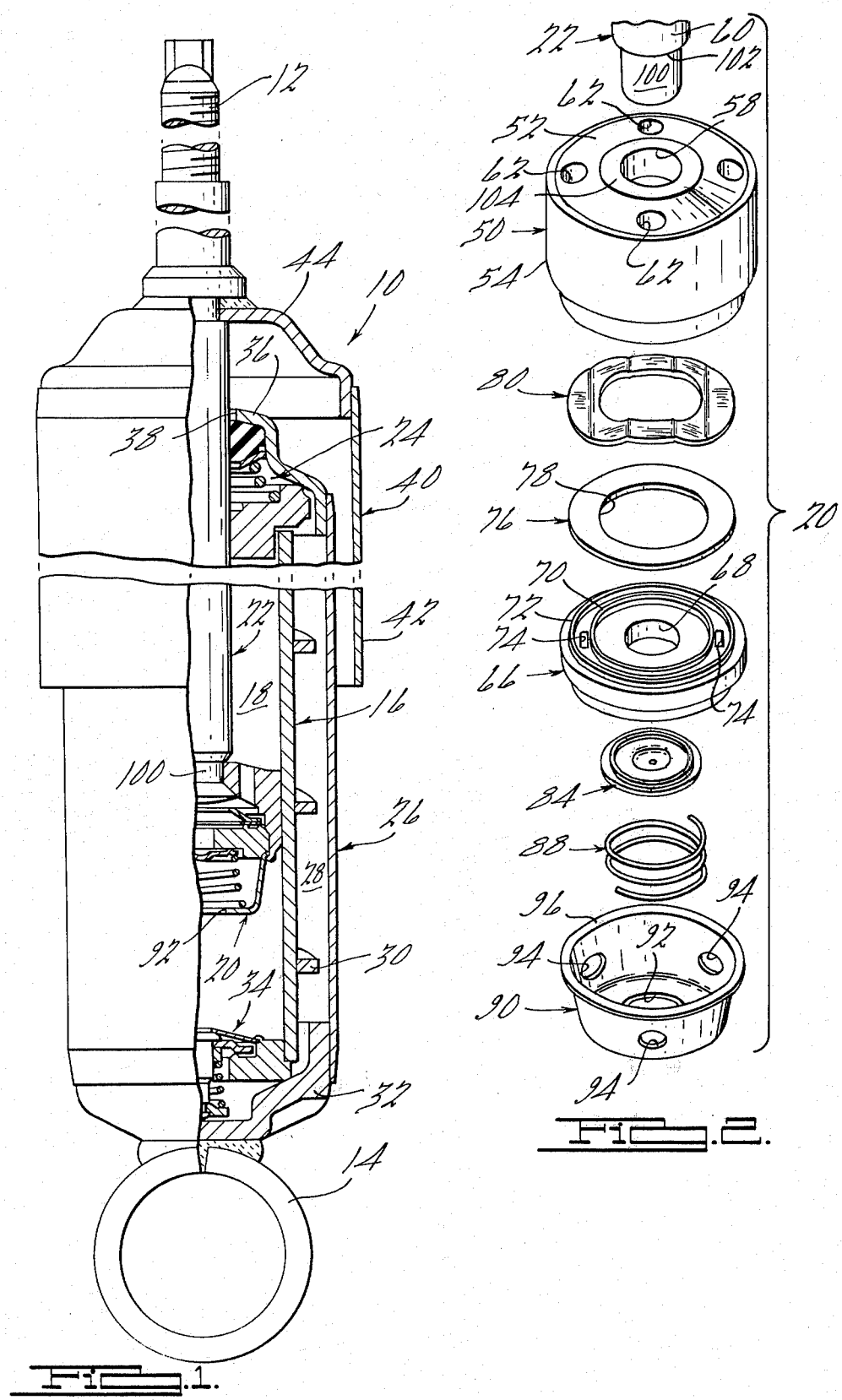

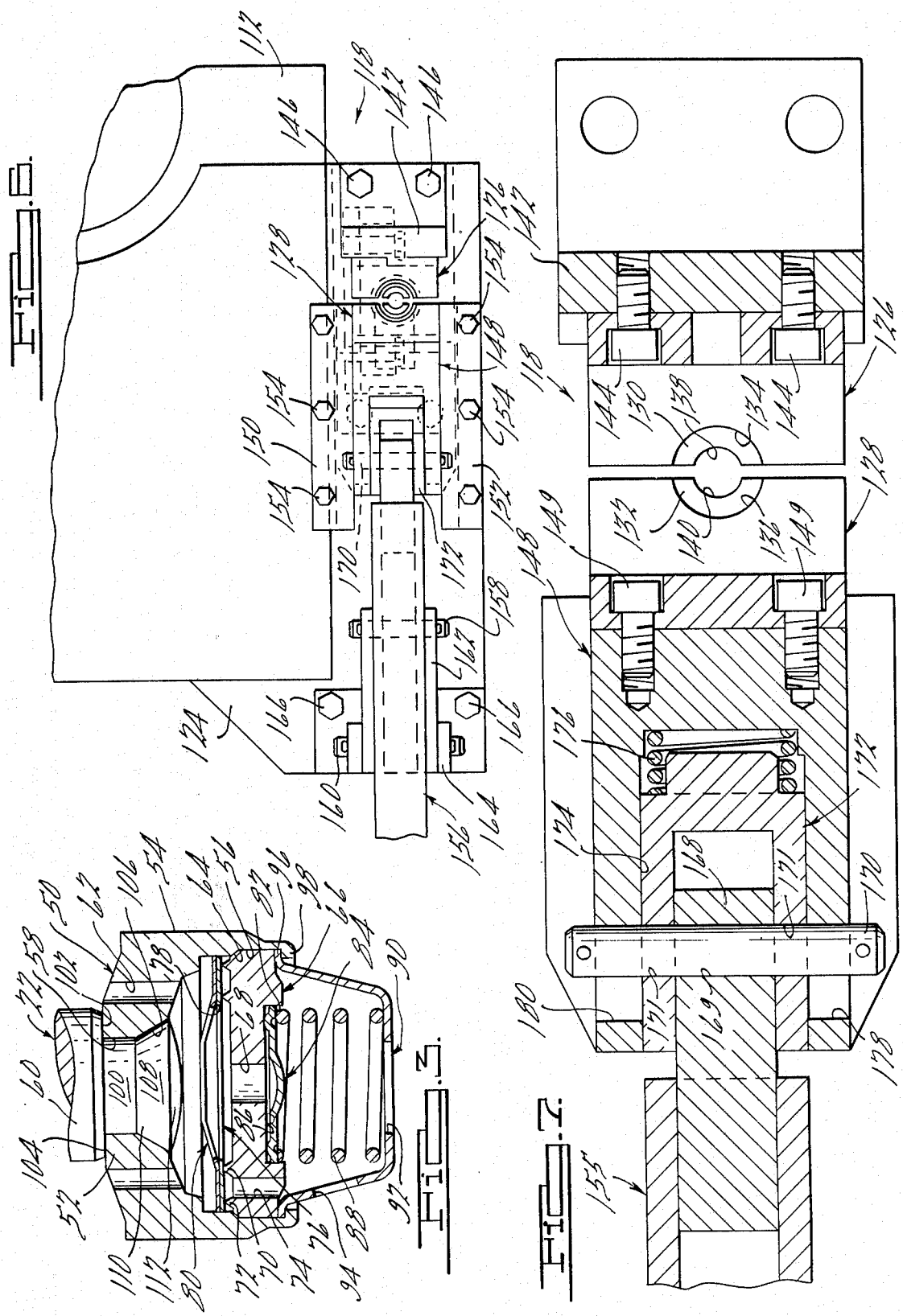

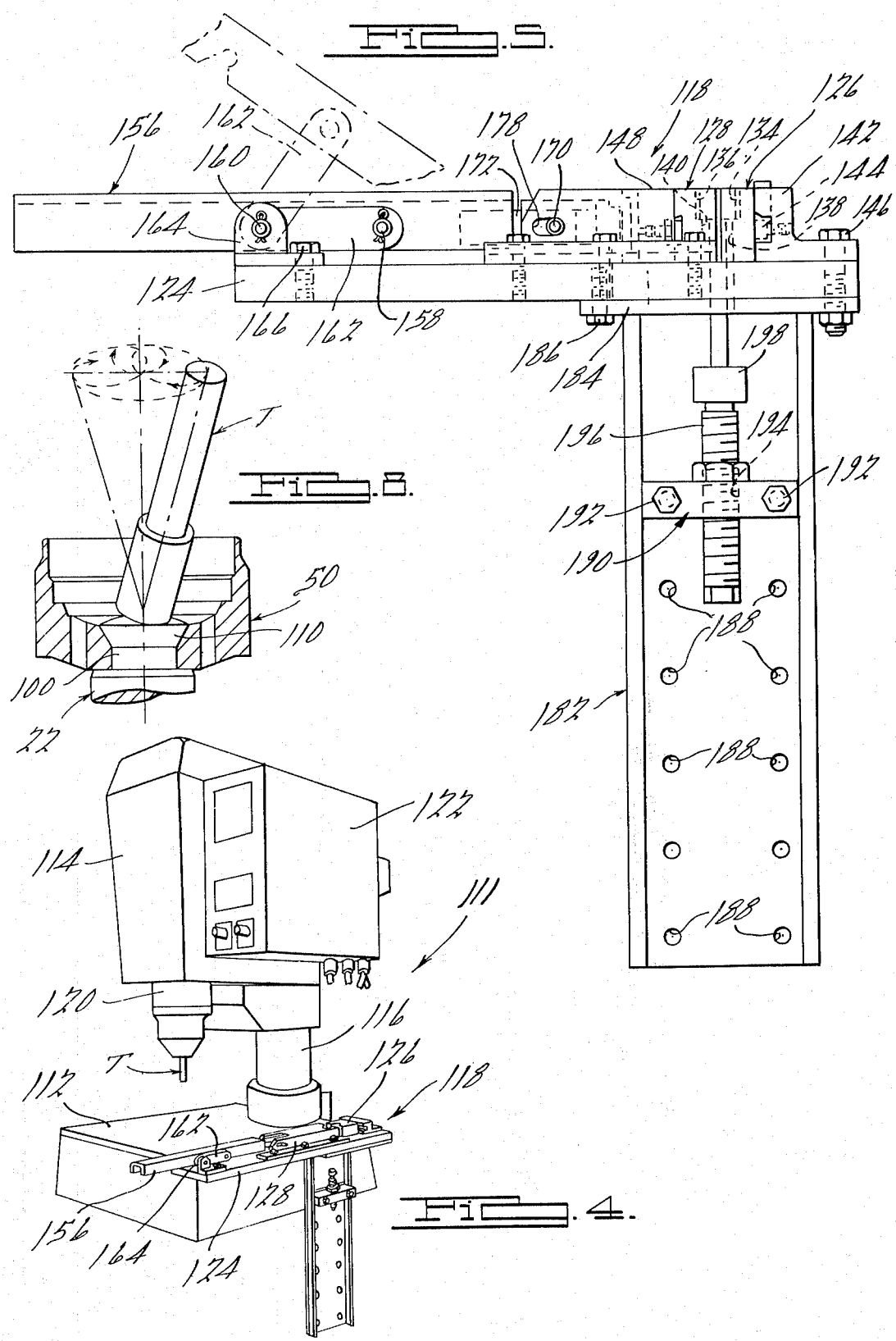

SHOCK ABSORBER AND METHOD AND APPARATUS FOR ASSEMBLING THE SAME

This is a division of application Ser. No. 444,759, filed Feb. 22, 1974, now abandoned.

BACKGROUND OF THE INVENTION

It has heretofore been the practice in the construction of vehicular shock absorbers of the type including a reciprocable piston located within a fluid chamber and provided with valve means for controlling the fluid flow through selected fluid ports, to operatively connect the piston assembly to one end of an associated piston rod which projects coaxially outwardly from the shock absorber and is connected, either directly or indirectly, to a portion of a vehicle suspension. Various means have been utilized in the prior art for operatively securing the piston assembly to the piston rod, one of the most common of which consists of providing some type of a threaded element, such as a nut or the like, and threadably connecting said element to an externally threaded portion formed on the adjacent end of the associated piston rod. One such example of this prior art construction is shown in U.S. Pat. No. 3,757,910, dated Sept. 11, 1973, and assigned to the assignee of this application. The aforesaid procedure of operatively connecting the piston assembly to the piston rod by means of a threaded element or nut has been found to be objectionable for a number of reasons, not the least of which is the cost and time required in machining the nut and associated piston rod.

Various solutions have been proposed to such prior art designs, including the idea of connecting the piston assembly to the associated piston rod by means of a welding operation, such as shown in U.S. Pat. No. 3,724,615, issued Apr. 3, 1973, wherein the piston body is connected by means of a weld operation to the adjacent end of the associated piston. This method of assembly, however, has not been entirely satisfactory due to the fact that it requires extremely costly equipment and proper quality control can be difficult to maintain. One more serious problem results from the aforesaid type of construction and that resides in the frequent necessity of providing some type of a sliding seal around the outer periphery of the piston body to assure that a fluid tight joint is provided between the outer periphery of the piston and the inner periphery of the adjacent cylinder wall, whereby to assure against fluid by-passing the piston instead of flowing through the valve ports normally provided therein. Such ancillary fluid sealing means have been required, at least in part, due to the eccentricity or "radial runout" between the axis of the piston rod and piston body which, in many instances, may be in the magnitude of several thousands of an inch. Moreover, while the aforesaid fluid seals have been found to be at least a satisfactory solution to such eccentricity between the piston and piston rod, in certain circumstances, the seals themselves become irregularly worn, thus permitting fluid by-passing and premature failure of the shock absorber.

A related short-coming of certain prior art designs, such as that shown in U.S. Pat. No. 3,187,847, results when the piston assembly is connected to the associated piston rod by means of a cold or hot "upsetting" process which results in substantial molecular distortion or alteration of the piston rod which may, under certain circumstances, have an adverse effect on the structural integrity of the material interconnecting the piston and piston rod, with the result that the connection falls short of the requisite tensile strength specifications in the industry.

The present invention is directed toward a new and improved shock absorber construction and method and apparatus for assembling the same which overcomes the various shortcomings of prior art designs. In particular, the present invention is directed toward a new piston-piston rod assembly wherein the piston rod is operatively connected to the piston assembly in a manner such that an extremely strong joint is provided therebetween without any sacrifice in the desired concentricity between the piston body and piston rod. The connection is achieved by means of inserting a tool into the valve chamber of the piston from the opposite side thereof from which the piston rod extends and operatively moving the tool in a preselected manner. Specifically, the tool is moved in a generally cycloidal path such that an overlapping rosette type pattern is formed. By so moving the tool, small portions of the material from which the piston rod is fabricated is moved radially outwardly to form an enlarged diameter head, with the material moving so gradually that there is virtually no molecular alteration destruction of the piston rod material. Accordingly, the unit strength of the resultant joint is extremely high. One particular advantage of the invention resides in the fact that the tool may be inserted interiorly of the valve chamber to a position where the tool may contact the end of the piston rod without in any way interferring with the fixture of apparatus which functions to coaxially support the piston and piston rod during assembly thereof. Accordingly, the highest concentricity standards may be readily achieved, as compared to prior art designs. An additional feature of the present invention resides in the fact that by properly designing the assembly tooling or fixtures, the piston and piston rod will be self-centering or aligning during the fastening or securing operation, thus assuring concentricity of the resultant assembly. Accordingly, the present invention provides a piston-piston rod assembly which is of substantially higher quality than prior art designs and yet may be manufactured at a considerable savings in capital equipment.

SUMMARY OF THE INVENTION

This invention relates generally to hydraulic shock absorbers and, more particularly, to a new and improved piston-piston rod assembly for use in such shock absorbers.

It is accordingly a general object of the present invention to provide a new and improved piston-piston rod assembly.

It is another object of the present invention to provide a new and improved means for operatively connecting the piston assembly and piston rod of a hydraulic shock absorber wherein an extremely strong joint is provided therebetween.

It is another object of the present invention to provide a new and improved piston-piston rod assembly which provides for maximum concentricity between the piston and piston rod without any sacrifice in the unit strength of the joint connecting these components.

It is still another object of the present invention to provide a new and improved apparatus for securing piston and piston rods in their assembled orientation during the performance of an assembly operation thereon.

It is yet another object of the present invention to provide a new and improved connecting means for operatively connecting a piston and an associated piston rod wherein the molecular structure of the connecting means is in no way altered or distorted, as is the case with prior known methods consisting of hot or cold upsetting, stamping or the like.

Other objects and advantages of the present invention will become apparent with the following detailed description taken in conjunction with the accompanying drawings.

BRIEF DESCRIPTION OF THE DRAWINGS

FIG. 1 is an elevated perspective view, partially broken away, of a vehicular shock absorber embodying the principles of the present invention;

FIG. 2 is an exploded assembly view of the piston assembly incorporating the shock absorber shown in FIG. 1;

FIG. 3 is an enlarged cross-sectional view of the piston assembly shown in FIG. 1;

FIG. 4 is an elevated perspective view of an exemplary embodiment of an apparatus for practicing the principles of the present invention and in particular, for securing the piston assembly to the associated piston rod of the shock absorber shown in FIG. 1;

FIG. 5 is a longitudinal side elevational view of an exemplary embodiment of the mounting fixture operatively associated with the apparatus shown in FIG. 4;

FIG. 6 is a top elevational view of the fixture shown in FIG. 4;

FIG. 7 is an enlarged cross-sectional view of the fixture shown in FIG. 5; and

FIG. 8 is an elevated perspective view, partially broken away and partially in schematic, of the method of securing the piston and piston rod incorporated in the shock absorber shown in FIG. 1.

DETAILED DESCRIPTION OF THE INVENTION

Referring now in detail to the drawings and in particular to FIG. 1 thereof, a vehicular shock absorber is shown as being generally designated by the numeral 10 and including upper and lower end fittings 12 and 14, respectively, which are adapted to be operatively secured to the sprung and unsprung portions of an associated automotive vehicle or the like. The shock absorber 10 includes a tubular or cylindrical pressure cylinder 16 which defines an interior fluid chamber 18. Disposed within the chamber 18 is a reciprocable piston assembly, generally designated by the numeral 20, which is operatively secured to a piston rod 22 that is disposed coaxially within the cylinder 16. The upper end of the piston rod 22 extends through a combination rod guide and seal assembly 24 which closes the upper end of the cylinder 16, as illustrated. Disposed around the exterior of the pressure cylinder 16 and arranged generally coaxially thereof is a reserve tube 26 which defines an annular fluid reservoir 28 with the outer periphery of the pressure cylinder 16. The reservoir 28 is adapted to contain a supply of hydraulic fluid which functions as a damping medium for reciprocal movement of the piston assembly 20 within the chamber 18 and means in the form of a suitable anti-aeration helical baffle 30 is provided within the reservoir 28 for purposes well known in the art. The lower end of the shock absorber 10 is provided with a lower end cap 32 which functions to operatively carry or support the lower end fitting 14, as illustrated, and means in the form of a suitable base valve assembly 34 is disposed interiorly of the end cap 32 and functions to operatively control the flow of fluid between the chamber 18 and the reservoir 28. The upper end of the shock absorber 10 is provided with an upper end cap 36 which is fixedly secured to the reservoir tube 26 and is formed with a central opening 38 through which the upper end of the piston rod 22 extends. A suitable dust shield 40 is shown upon the upper end of the piston rod and includes a generally cylindrical portion 42 extending coaxially around the outer periphery of the reserve tube 26, and a generally cup-shaped securing portion 44 which is attached to the upper end of the piston rod 22 directly adjacent the upper end fitting 12.

Referring now in detail to the construction of the piston assembly 20, as best seen in FIGS. 2 and 3, the assembly 20 includes a generally cup-shaped piston body 50 which is preferably, although not necessarily, fabricated of a high density sintered metal. Alternatively, the body could be formed by a conventional cold upsetting process. The body 50 includes a base portion 52 and a generally downwardly extending peripheral skirt portion 54 which defines with the base portion 52 an annular valve cavity 56. The base portion 52 is formed with a central annular opening 58 which cooperates with a lower end section 60 of the piston rod 22 is operatively securing the piston assembly 20 thereto, as will hereinafter be described. The base portion 52 of the piston body 50 is also formed with a plurality of equally circumferentially spaced axial flow ports which are spaced radially outwardly from the central opening 58 and are generally designated by the numeral 62. Disposed interiorly of the peripheral skirt 54 is a radially inwardly extending annular shoulder 64 against which an annular valve plate, generally designated by the numeral 66, is operatively disposed. The valve plate 66 is formed with a central opening 68 and the upper side thereof is formed with a pair of radially spaced concentrically oriented inner and outer annular valve seats 70 and 72, respectively. Extending axially through the valve plate 66 at a position between the valve seats 70, 72 is a plurality of circumferentially spaced flow ports, generally designated 74. The flow ports 74 are normally closed by an annular valve disk 76 which is urged into sealing engagement with the upper ends of valve seats 70, 72 by means of an annular valve spring, generally designated by the numeral 80.

The under or lower side of the valve plate 66 is formed with a central counter bore 82 which is coaxially arranged relative to the central opening 68 and is adapted to nestingly receive an annular valve seat member 84. The member 84 is urged upwardly into sealing engagement with a flat radially disposed surface 86 within the counter bore 82 by means of a helical coil spring, generally designated by the numeral 88. As illustrated, the upper end of the spring 88 bears against the underside of the member 84, while the lower or opposite end of the spring 88 is operatively supported upon or within a spring cage, generally designated by the numeral 90. The cage 90 is of a generally cup-shaped configuration and is formed with a lower central opening 92 and with a plurality of peripheral or side openings 94. The upper end of the cage 90 is formed with a radially outwardly extending shoulder portion 96 which is adapted to be fixedly secured along with the valve plate 76 by means of a lower crimped flange portion 98 formed at the distal or terminal end of the peripheral skirt portion 54.

As will be appreciated by those skilled in the art, during a compression stroke of the shock absorber 10 wherein the piston assembly 20 moves downwardly within the chamber 18, hydraulic fluid will flow through the spring cage 90 and thereafter through the plurality of ports 74, thereby unseating the valve disk 76 from the valve seats 70, 72. Conversely, during a rebound stroke wherein the piston assembly 20 and piston rod 22 move upwardly within the chamber 18, fluid will flow downwardly through the flow ports 62, through a central opening 78 formed in the valve disk 76 and thereafter through the central opening 68 of the valve plate 66. This fluid will then effect unseating of the member 84 against the resistance of the spring 88, from where the fluid will flow through the spring cage 90 into the lower end of the chamber 18.

In accordance with the principles of the present invention, the end portion 60 of the piston rod 22 is adapted to be operatively connected to the piston body 50 in a new and unique way so as to provide for extreme concentricity between the axis of the piston rod 22 and the piston assembly 20 without any sacrifice in the tensile strength at the interconnected portions thereof. Toward this end, the actual connecting means utilized in securing the piston body 50 to the piston rod 22 is in the form of a rivet-like joint which is produced by selectively and progressively moving a tool against the end portion 60 and in particular, toward and into engagement with the end of the reduced diameter portion 100 of the rod 22 which extends through the central opening 58 in the piston body 50. In the manner best shown in FIG. 8, the tool, herein designated by the indicia T is adapted to be moved in a generally cycloidal manner along or in an overlapping rosette pattern and the force applied by the tool to the end portion 100 of the piston rod 22 is such that the material of the piston rod 22 is stressed beyond its compressive unit strength, yet short of its ultimate strength. The material of the rod 22 is thereby deformed progressively as a result of the cycloidal movement of the tool T so that it flows into the shape best shown in FIG. 3 and hereinafter to be described without any heat buildup, change in molecular structure or damage to any protective coating which may have previously been applied to the piston rod 22. By properly controlling the cycloidal pattern and force that the tool exerts against the rod 22, only a minute quantity of material is displaced during each revolution or orbit of the tool T, and consequently, a smooth flow or wave of material is formed ahead of the orbiting tool during its downward stroke. The action of the tool T takes place in a three dimensional working cycle: (a) radially outwardly, (b) radially inwardly, and (c) overlapping tangentially, with only a small portion of the tool T actually contacting the end of the piston rod 22 which results in the aforementioned flow of material without the usual molecular destruction and cracking of material as occurs during cold or hot upseting processes known in the prior art and causes severe molecular distortion and compression of the metal fibers. It is preferred that there is no rotation between the tool T relative to the end portion 100 of the piston rod, but instead, that the tool T exert a gentle but firm force against the material constituting the end portion 100. By precisely controlling the pressure applied by the tool T, virtually noiseless production is achieved, as compared with normal riveting, stamping, upsetting processes and the like, thus complying with Federal Safety Health Laws. A typical operational cycle involves the tool T making approximately eleven loops during its cycloid movement, with the loops of the moving tool overlapping each other to provide total coverage, thus insuring a strong uniform grain structure without any reduction of the tensile strength of the piston rod 22 below its tensile yield.

In a preferred construction of the present invention, the end portion 100 is defined by the generally flat radially disposed surface or shoulder 102 on the piston rod 22, which surface 22 is adapted to be engaged with a flat radially extending surface 104 formed on the upper or outer end of the piston body 50. The inner end of the opening 58 is formed with a generally conically shaped counter bore or chamfer section 106 the peripheral wall of which is at an approximately 30° angle relative to the longitudinal axis of the piston body 50. Accordingly, during the securing operation, the details of which will hereinafter be described, the end portion 100 of the piston rod 22 is formed with a head section 108 consisting of a generally frusto-conical portion 110 and a rounded or circular terminal end portion 112 and the maximum diameter of which is larger than the diameter of the opening 58, thus assuring for a strong positive connection between the rod 22 and piston body 50. One feature of the present invention resides in the fact that the frusto-conical shape of the counter bore 106 and piston rod portion 110 results in the self-centering or automatic coaxial alignment between the piston rod 22 and piston body 50 as the two components are secured to one another.

Referring now to FIG. 4, an exemplary embodiment of a machine or apparatus for performing the operation to secure the piston body 50 to the piston rod 22 is generally designated by the numeral 111. The machine 111 comprises a bed or support platform 112 above which an operating head 114 is supported by means of a suitable pivotal support pedestal or the like 116. Disposed adjacent the bed 112 is a work stock fixture, generally designated by the numeral 118, which is adapted to operatively support a piston rod 22 and piston body 50 as these components are being operatively secured to one another. It will be noted that the fixture 118 is illustrated merely for purposes of example and that the present invention is not in any way intended to be limited to the specific configuration of the fixture 118 disclosed herein. The operating head 114 includes a tool chuck or holder 120 which is adapted to operatively support the tool T hereinabove described, with means in the form of an operating control box or the like 122 being located adjacent the head for effecting energization of the chuck 120 in a manner well known in the art.

With reference now to the construction and operation of the fixture 118, as best seen in FIGS. 4 through 7, the fixture 118 includes a generally horizontally disposed support plate 124 which is fixedly secured to the bed or platform 112. Disposed above and supported upon the plate 124 is a pair of locking jaws 126 and 128 which are adapted to nestingly receive and operatively support a piston body, such as the body 50, and the upper end of a piston rod, such as the piston rod 22, during the time the operating head 114 performs the aforedescribed operation upon the end portion 100 of the piston rod 22 in order to effect securing thereof to the piston body 50. As best seen in FIG. 7, the locking jaws 126, 128 define confronting semicircular recesses 130 and 132, respectively. The recesses 130, 132 are formed with relatively enlarged diameter upper portions 134 and 136, respectively, and with relatively smaller diameter lower portions 138 and 140, respectively. When the jaws 126, 128 are oriented in the position shown in the drawings, a typical piston body 50 is adapted to be received between and supported within the upper portions 134, 136 thereof, while the upper end of a piston rod 22 is adapted to be operatively supported and secured within the lower portions 138, 140. The jaw 126 is adapted to be fixedly secured to the plate 124 by means of a support bracket or the like 142 which is secured via suitable screws, bolts or the like 144 to the jaw 126. The bracket 142 is in turn secured via suitable bolts or the like 146 to the upper side of the plate 124, as illustrated.

Although the locking jaw 126 is fixedly secured to the plate 124, the jaw 128 associated therewith is adapted to be moved toward and away from the jaw 126 in order to lockingly secure a piston body 50 and piston rod 22 within the fixture 118. Accordingly, the locking jaw 128 is operatively secured to a suitable support bracket 148 by means of screws, bolts or the like 149, as shown in FIG. 7. The bracket 148 and hence the locking jaw 128 secured thereto is adapted to be moved toward and away from the jaw 126 in a manner hereinafter to be described and means for guiding the support bracket 148 for such movement is provided by a pair of spaced parallel guideways 150 and 152 which are secured to the upper side of the plate 124 by means of suitable screws, bolts or the like 154. The support bracket 148 and locking jaw 128 secured thereto is movable longitudinally within the guideways 150, 152 by means of an elongated manually graspable or engageable locking arm 156 one end of which is connected via pivot pins 158 and 160, and a pivotal linkage 162 to a pivot clevis 164 operatively secured upon the upper side of the plate 124 by means of suitable screws, bolts or the like 166. The inner or rightwardly end of the locking arm 156, herein identified by the numeral 168, is formed with a transversely extending bore 169 through which a transversely extending cross pin 170 extends. The cross pin 170 also extends through aligned apertures 171 in a reciprocable piston or plunger 172 that is nestingly received within a recess or blind bore 174 formed in the support bracket 148. Disposed interjacent the inner end of the plunger 172 and the innermost portion of the bore 174 is a compression spring 176 which functions in a manner hereinafter to be described. The opposite ends of the cross pin 170 extend through elongated apertures 178 and 180 formed in the bracket 148 on opposite sides of the blind bore 174 and are intended to provide for limited longitudinal sliding movement of the plunger 172 within the bore 174. The provision of the linkage 162 and sliding movement of the plunger 172 within the support bracket 138 provides for an over center movement of the locking arm 156 so as to effect lockingly securing a piston body 50 and piston rod 22 between the jaws 126, 128. More particularly, assuming that the arm 156 is normally disposed in the phantom line position shown in FIG. 5, the jaws 126, 128 are spaced sufficiently apart to permit a piston rod 22 to be inserted between the lower recessed portions 138, 140, while a piston body 50 may be deposited between the upper recessed portions 134, 136. Thereafter, the arm 156 is pivotally biased from the phantom line position shown in FIG. 5 to the solid line position shown in this figure, whereupon the support bracket 148 and locking jaw 128 supported thereon will move toward the right until such time as the arm 156 is lockingly secured in the position shown in solid lines in FIG. 5. With the arm 156 in this position, the plunger 172 will, via the compressed coil spring 176, exert a rightwardly directed force against the bracket 148 and hence against the jaw 128. The dimensions of the recesses 130, 132 are such that when the arm 156 is disposed in its locked downward position, the piston body 50 and piston rod 22 will be lockingly secured therewithin so that there will be no movement therebetween or relative to the head 112 of the apparatus 111 during the securing operation.

With reference again to FIG. 5, extending downwardly from the underside of the plate 124 is a generally vertically disposed support plate 182. The upper end of the plate 182 is secured via an attachment section 184 and suitable screws, bolts or the like 186 to the underside of the plate 124 at a position generally beneath the jaws 126, 128. The plate 182 is formed with a plurality of pairs of generally horizontally aligned, vertically spaced apertures, generally designated by the numeral 188, to which a support block 190 is adapted to be selectively secured, as by suitable screws, bolts or the like 192. The support block 190 is formed with a generally centrally located vertically disposed threaded opening 194 within which an adjustment member 196 is threadably received. The member 196 is located in vertical alignment with the center of the recesses 130, 132 and the upper end thereof defines a support surface 198 upon which the lower end of a piston rod 22 is adapted to be supported during the operation connecting the opposite or upper end of the rod 22 to an associated piston body 50. Accordingly, the member 96 may be vertically adjusted within the block 190 and the block 190 may in turn be vertically adjusted by being secured to selected of the pairs of apertures 188 so that the surface 198 is properly and vertically spaced relative to the jaws 126, 128 such that when a piston rod 22 is dropped downwardly therebetween, the lower end of the rod 22 will rest upon a surface 198, while the upper end thereof will be properly vertically located relative to the piston body 50 mounted within the upper recessed portions 134, 136 such that the surface 102 on the piston rod 22 is engaged with the surface 104 on the piston body.

Referring now in detail to the overall method of operatively securing the piston body 50 to the associated piston rod 22, assuming that the locking arm 156 is disposed in its upwardly or unlocked position shown in phantom lines in FIG. 5, the piston rod 22 is initially inserted downwardly between the jaws 126, 128 to a position wherein the lower end thereof is supported upon the surface 198 of the member 196. Thereafter, the piston body 50 is dropped downwardly within the recesses 130, 132 at a position wherein the valve cavity 56 is facing upwardly. As previously mentioned, when the body 50 and piston rod 22 are thus positioned, the surfaces 102 and 104 are contiguously engaged with one another. Thereafter, the locking arm 56 is pivoted from the phantom line position shown in FIG. 5 to the solid line position shown in this figure, thereby lockingly securing the piston body 50 and piston rod 22 relative to machine 111. The operating head 114 of the machine 111 is thereafter properly positioned by suitable rotation upon the pedestal 116 such that the axis of the chuck 120 is properly aligned with the axis of the body 50 and piston rod 22, after which time the head 114 may be energized. When this occurs, the tool T will perform the deforming action hereinabove described as a result of its cycloidal movement, whereupon the end portion 100 of the piston rod 22 will be deformed in a manner such that the frusto-conical and rounded head portions 110 and 112 will be formed, as best seen in FIG. 3, thereby operatively securing the body 50 to the piston rod 22. After the securing operation has thus been completed, the locking arm 156 may be pivoted upwardly or in a generally clockwise direction in FIG. 5, thereby releasing the unitized assembly of the body 50 and piston rod 22 from within the jaws 126, 128. The remainder of the piston components may thereafter be operatively mounted within the valve cavity 56 by properly inserting the valve disk 76, valve spring 80, valve plate 66, valve member 84, spring 88, and finally the spring cage 90 may be operatively secured to the body 50 by properly crimping the flange portion 98. After this has been completed, the entire assembly of the piston 20 and piston rod 22 may be assembled into the shock absorber 10 for completion of the assembly process.

While it will be apparent that the preferred embodiment herein illustrated is well calculated to fulfill the objects above stated, it will be appreciated that the present invention is susceptible to modification, variation and change without departing from the scope of the invention.

I claim:

1. In an apparatus for assembling a piston rod to an associated piston having a central bore formed therein and terminating at one end of the piston in an enlarged diameter counterbore,
   fixture means having first and second coaxially arranged portions for coaxially supporting the piston and piston rod, respectively, at a position wherein one end of the piston rod is received within said bore,
   tool means located adjacent said first portion of said fixture means and adapted to extend into said counterbore and engage said one end of said piston when said piston and piston rod are supported in said fixture means, whereby said tool means is operable to form an enlarged diameter head portion on the end of said piston rod extending into said piston bore thereon, and
   means for causing said tool to move in a generally cycloidal path, whereby the material of said piston end is deformed radially outwardly without the molecular structure thereof being appreciably distorted or otherwise altered.

2. The invention as set forth in claim 1 which includes means for supporting the piston and piston rod in a generally vertical position.

3. The invention as set forth in claim 2 wherein said fixture means includes means for simultaneously clampingly engaging the piston and piston rod in a coaxial relationship.

4. The invention as set forth in claim 1 wherein said fixture means includes cooperating jaw means for engaging the piston and piston rod.

5. The invention as set forth in claim 4 wherein said clamping jaw means each include a first diameter portion adapted to receive the piston and a second diameter portion adapted to receive the piston rod.

6. The invention as set forth in claim 4 which includes means for moving one of said jaws relative to the other thereof to effect simultaneous clamping engagement of the piston and piston rod.

7. The invention as set forth in claim 1 which includes means for supporting said tool generally coaxially of said piston rod.

8. The invention as set forth in claim 1 wherein said tool moving means is operable to move said tool to form said enlarged head portion without causing said tool to engage the peripheral wall of said piston counterbore.

9. In an apparatus for assembling a shock absorber piston rod and an associated piston having a recessed area on one side thereof and a central bore extending between said recessed area and the opposite side of said piston,
   clamping means having a first portion for clampingly engaging the piston and a second portion for clampingly engaging the piston rod and supporting said piston rod on the side of said piston opposite said recessed area thereof and at a position wherein one end of the piston rod is disposed within said bore and said piston and piston rod are coaxially oriented relative to one another,
   a deforming tool located on the opposite side of said first portion of said clamping means having said second portion of said clamping means for forming an enlarged diameter head portion thereon, and
   means for causing said tool to engage said piston rod end portion and move in a generally overlapping rosette pattern but not contact the peripheral walls of said piston which define said recessed area.

10. The invention as set forth in claim 9 wherein said clamping means includes cooperating jaw means for engaging the piston and piston rod and orienting the same in said coaxial orientation.

11. The invention as set forth in claim 10 wherein said clamping jaw means each include a first diameter portion adapted to engage the piston and a second diameter portion adapted to engage the piston rod.

12. The invention as set forth in claim 11 which includes means for moving one of said jaw portions relative to the other thereof to effect simultaneous clamping engagement of the piston and piston rod.

13. The invention as set forth in claim 9 wherein the portion of said tool which extends into said recessed area is smaller in cross-sectional size than the cross-sectional size of said recessed area and wherein the length of said tool is greater than the axial depth of said recessed area so as to prevent said tool moving means from engaging said piston.

* * * * *